(12) United States Patent
Shi et al.

(10) Patent No.: US 6,587,237 B1
(45) Date of Patent: Jul. 1, 2003

(54) METROPOLITAN AREA NETWORK USING LOW INSERTION LOSS OPTICAL ADD-DROP MULTIPLEXERS

(75) Inventors: Chao-Xiang Shi, Milpitas, CA (US); Li-Ping Chen, Foster City, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/549,135

(22) Filed: Apr. 13, 2000

(51) Int. Cl.[7] .................................................. H04J 14/02
(52) U.S. Cl. ........................ 359/118; 359/127; 359/130; 385/24; 385/37
(58) Field of Search ................................. 359/124, 127, 359/130, 118, 119; 385/24, 37

(56) References Cited

U.S. PATENT DOCUMENTS

5,717,795 A * 2/1998 Sharma et al. ................. 385/24
6,281,997 B1 * 8/2001 Alexander et al. ........... 359/130
6,493,117 B1 * 12/2002 Milton et al. ................ 359/124

OTHER PUBLICATIONS

Anthony S. Kewitsch, George A. Rakuljic, Phil A. Willems, and Amnon Yariv, "All–fiber zero–insertion–loss add–drop filter for wavelength–division multiplexing," Optics Letters, Optical Society of America, vol. 23 (No. 2), pp. 106–108, (Jan. 15, 1998).

United Technologies, "Fiber Bragg Grating," pp. 1–4, (http://www.crc/ca/crc/catalogue/Bragg.html), (Jan. 11, 2000).

Near Margalit, "Intelligent DWDM takes Gigabit Ethernet to the MAN," Lightwave, vol. 16 (No. 9), (Jun., 1999).

Photronix, "Fiber Bragg Grating Technology," (http://www.photonixm.com/Technology.htm), p. 1, (1999 ).

* cited by examiner

*Primary Examiner*—Kinfe-Michael Negash
(74) *Attorney, Agent, or Firm*—Harley R. Ball; Steven J. Funk; Kevin D. Robb

(57) ABSTRACT

A Metropolitan Area Network (MAN) is disclosed that is comprised of a central node, an optical fiber, a first low insertion loss Optical Add-Drop Multiplexer (O-ADM), a second low insertion loss O-ADM, and a third low insertion loss O-ADM. The first, second, and third O-ADMs are coupled to the optical fiber and configured to drop wavelengths from an optical signal. The first, second, and third O-ADMs each have an insertion loss of less than approximately 1.00 dB. The low insertion loss O-ADMs create an efficient MAN that can grow much larger than current MANs in the absence of optical line amplifiers.

15 Claims, 5 Drawing Sheets

METROPOLITAN AREA NETWORK USING LOW INSERTION LOSS OPTICAL ADD-DROP MULTIPLEXERS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to the field of optical communication systems, and in particular, to a Metropolitan Area Network (MAN) using low insertion loss Optical Add-Drop Multiplexers (O-ADMs).

2. Description of the Prior Art

Fiber optic networks vary in size to accommodate different communication needs. Wide Area Networks (WANs) span the nation providing communications over long distances. Local Area Networks (LANs), in contrast, provide communications over short distances, such as in a building. In between WANs and LANs are Metropolitan Area Networks (MANs). MANs are smaller than WANs and larger than LANS, and typically range in size from approximately 25 km to 100 km. MANs are typically used for communications on a campus or in a city.

WANs use optical fiber amplifiers to boost optical signals transmitted over the network because of the expansive distances covered by the networks. MANs typically do not use optical fiber amplifiers in an attempt to keep costs and design complexity at a minimum. The smaller size and absence of optical fiber amplifiers could be features that distinguish MANs from WANs. Without optical fiber amplifiers, MANs are limited in how large they can grow.

Fiber optic networks, including MANs, often utilize multiplexing technologies to increase the volume of traffic upon the network. One such multiplexing technology is Wavelength Division Multiplexing (WDM). WDM is used to pass multiple data channels over one or more wavelengths of light simultaneously over a single fiber. As an optical signal is transmitted over the fiber, wavelengths can be dropped or added at nodes set out in the network. The nodes typically use Optical Add-Drop Multiplexers (O-ADMs) to add wavelengths to, and drop wavelengths from, the optical signal. Typically, a node is assigned a wavelength so that each node in the system drops and adds different wavelengths.

FIG. 1 shows a Metropolitan Area Network (MAN) 100 in the prior art. MAN 100 is comprised of a fiber 110, a central node 112, and O-ADMs 121–126. Each end of fiber 110 is coupled to the central node 112 to form a ring. O-ADMs 121–126 are coupled to fiber 110 in series. Central node 112 is connected to a first system (not shown) and configured to transmit an optical signal comprised of wavelengths $\lambda_1$–$\lambda_n$ over fiber 110, transmit signals to the first system, and receive signals from the first system. O-ADMs 121–126 are configured to drop wavelengths from, and add wavelengths to, the optical signal.

In operation, central node 112 transmits the optical signal comprised of wavelengths $\lambda_1$–$\lambda_n$ over fiber 110. O-ADM 121 receives the optical signal from central node 112. O-ADM 121 drops a wavelength $\lambda_1$ from the optical signal and transfers $\lambda_1$ to a second system (not shown). O-ADM 121 also receives $\lambda_1$ from the second system and adds $\lambda_1$ back to the optical signal. O-ADM 121 transfers the optical signal to O-ADM 122. O-ADM 122 drops a wavelength $\lambda_2$ from the optical signal and transfers $\lambda_2$ to a third system (not shown). O-ADM 122 also receives $\lambda_2$ from the third system and adds $\lambda_2$ back to the optical signal. O-ADM 122 transfers the optical signal to O-ADM 123. The same operation takes place over O-ADMs 123–126. Central node 112 receives the optical signal comprised of wavelengths $\lambda_1$–$\lambda_n$ from O-ADM 126. Two common O-ADMs used in the art are single fiber grating O-ADMs and dielectric film filter type O-ADMs.

FIG. 2 shows a single fiber grating O-ADM 200 commonly used in MANs in the prior art. O-ADM 200 is comprised of a first optical circulator 220 coupled to a second optical circulator 222 by a fiber 214. Between optical circulators 220 and 222, a Bragg grating 230 is written into fiber 214. The Bragg grating 230, which is based on the Bragg effect, is a periodic perturbation of the effective refractive index of fiber 214, wherein fiber 214 is photo-sensitive. The Bragg grating 230 is configured to reflect a narrow or broad range of wavelengths of light while passing all other wavelengths. The Bragg grating 230 is written into fiber 214 with a laser beam of Ultra-Violet (LV) light. The UV light permanently changes the refractive index of fiber 214.

In operation, optical circulator 220 receives an optical signal comprised of wavelengths $\lambda_1$–$\lambda_n$ over a fiber 210. The optical signal passes through optical circulator 220 to the Bragg grating 230. The Bragg grating 230 drops a wavelength $\lambda_1$ from the optical signal by reflecting $\lambda_1$ back to optical circulator 220. Optical circulator 220 prevents $\lambda_1$ from propagating over fiber 210 and transfers $\lambda_1$ over a fiber 212. The optical signal comprised of wavelengths $\lambda_2$–$\lambda_n$ passes through the Bragg grating 230. Optical circulator 222 receives the optical signal comprised of wavelengths $\lambda_2$–$\lambda_n$ over fiber 214 and $\lambda_1$ over a fiber 216. Optical circulator 222 adds $\lambda_1$ back to the optical signal. O-ADM 200 transfers the optical signal comprised of wavelengths $\lambda_1$–$\lambda_n$ over a fiber 218. Optical circulators 220 and 222 typically have an insertion loss between 0.8 and 1.0 dB. Thus, the insertion loss of O-ADM 200 is typically above 1.6 dB. The strength of the optical signal is appreciably diminished by the insertion loss of O-ADM 200.

FIG. 3 shows a dielectric film filter type O-ADM 300 also commonly used in MANs in the prior art. O-ADM 300 is comprised of a first dielectric WDM add-drop filter 320 coupled to a second dielectric WDM add-drop filter 322 by a fiber 314.

In operation, dielectric WDM add-drop filter 320 receives an optical signal comprised of wavelengths $\lambda_1$–$\lambda_n$ over a fiber 310. Dielectric WDM adddrop filter 320 drops a wavelength $\lambda_1$ from the optical signal by filtering $\lambda_1$ and transfers $\lambda_1$ over a fiber 312. The optical signal comprised of wavelengths $\lambda_2$–$\lambda_n$ passes through dielectric WDM add-drop filter 320 and over fiber 314. Dielectric WDM add-drop filter 322 receives the optical signal comprised of wavelengths $\lambda_2$–$\lambda_n$ over fiber 314 and $\lambda_1$ over a fiber 316. Dielectric WDM add-drop filter 322 adds $\lambda_1$ back to the optical signal. O-ADM 300 transfers the optical signal comprised of wavelengths $\lambda_1$–$\lambda_n$ over a fiber 318. Dielectric WDM add-drop filters 320 and 322 typically have an insertion loss between 0.8 and 1.0 dB. Thus, the insertion loss of O-ADM 300 is typically above 1.6 dB. The strength of the optical signal is appreciably diminished by the insertion loss of O-ADM 300.

Fused fiber O-ADMs have been disclosed that have a lower insertion loss than O-ADM 200 in FIG. 2 and O-ADM 300 in FIG. 3. FIG. 4 shows a fused fiber O-ADM 400. O-ADM 400 is comprised of a first fiber 410 coupled to a second fiber 412. A portion of first fiber 410 is fused to a portion of second fiber 412 to form a fused region 414. The fused region 414 has a first side 421 and a second side 422. A Bragg grating 416 is written into the fused region 414 as discussed in FIG. 2. First fiber 410 is configured to couple to a fiber optic network:(not shown) carrying optical signals. Second fiber 412 is configured to couple to a system (not shown, wherein the system is configured to transmit and receive a wavelength $\lambda$.

In operation, O-ADM 400 receives an optical signal comprised of wavelengths $\lambda_1$–$\lambda_n$ over first fiber 410 on the first side 421 of the fused region 414. The optical signal travels into the fused region 414 and the Bragg grating 416 drops a wavelength $\lambda_1$ from the optical signal by reflecting $\lambda_1$ back over the second fiber 412. Wavelength $\lambda_1$ does not reflect back over the first fiber 410 or pass through the Bragg grating 416. The optical signal comprised of wavelengths $\lambda_2$–$\lambda_n$ passes through the Bragg grating 416 and over first fiber 410 on the second side 422 of the fused region 414. On the second side 422 of the fused region, O-ADM 400 receives $\lambda_1$ over second fiber 412. Wavelength $\lambda_1$ travels into the fused region 414 and the Bragg grating 416 reflects $\lambda_1$ back over first fiber 410. The Bragg grating 416 adds $\lambda_1$ back to the optical signal. O-ADM 400 transfers the optical signal comprised of wavelengths $\lambda_1$–$\lambda_n$ over fiber 410. The O-ADM 400 typically has an insertion loss of less than 0.1 dB.

A problem with MAN 100 is the current O-ADMs being used to drop and add wavelengths have high insertion losses, such as O-ADMs 200 and 300. Each O-ADM that is added to MAN 100 that has an insertion loss of above 1.6 dB will seriously degrade the optical signal. Because MANs typically do not utilize optical fiber amplifiers, the size of MAN 100 is limited. Also, the number of nodes using O-ADMs to drop and add wavelengths is limited.

SUMMARY OF THE INVENTION

A Metropolitan Area Network (MAN) solves the above problems by utilizing low insertion loss O-ADMs to drop wavelengths from, and add wavelengths to, an optical signal. The MAN is comprised of a central node, a fiber, a first Optical Add-Drop Multiplexer (O-ADM), a second O-ADM, and a-third O-ADM. Each end of the fiber is coupled to the central node forming a ring, and the first, second, and third O-ADMs couple to the fiber in series. The first, second, and third O-ADMs each have an insertion loss that is less than approximately 1.00 dB. The MAN is able to grow much larger than prior MANs because of low insertion loss O-ADMs.

In one embodiment, the first, second, and third O-ADMs are fused fiber OADMs. A fused fiber O-ADM is comprised of a first fiber coupled to a second fiber. A portion of the first fiber is fused to a portion of the second fiber to form a fused region. A fiber grating is written into the fused region. The fiber grating reflects wavelengths from optical signals and the fiber grating can reflect different wavelengths depending on how it is written into the fused region.

The invention is much more efficient than current MANs. The O-ADMs used in the current networks typically have insertion losses above 1.6 dB, while the invention uses O-ADMs with insertion losses of less than approximately 0.1 dB. Therefore, when optical fiber amplifiers are not implemented, the fiber optic network can be many times larger than the current networks.

DETAILED DESCRIPTION OF THE PREFERRED EMBODIMENT

Figure 5:
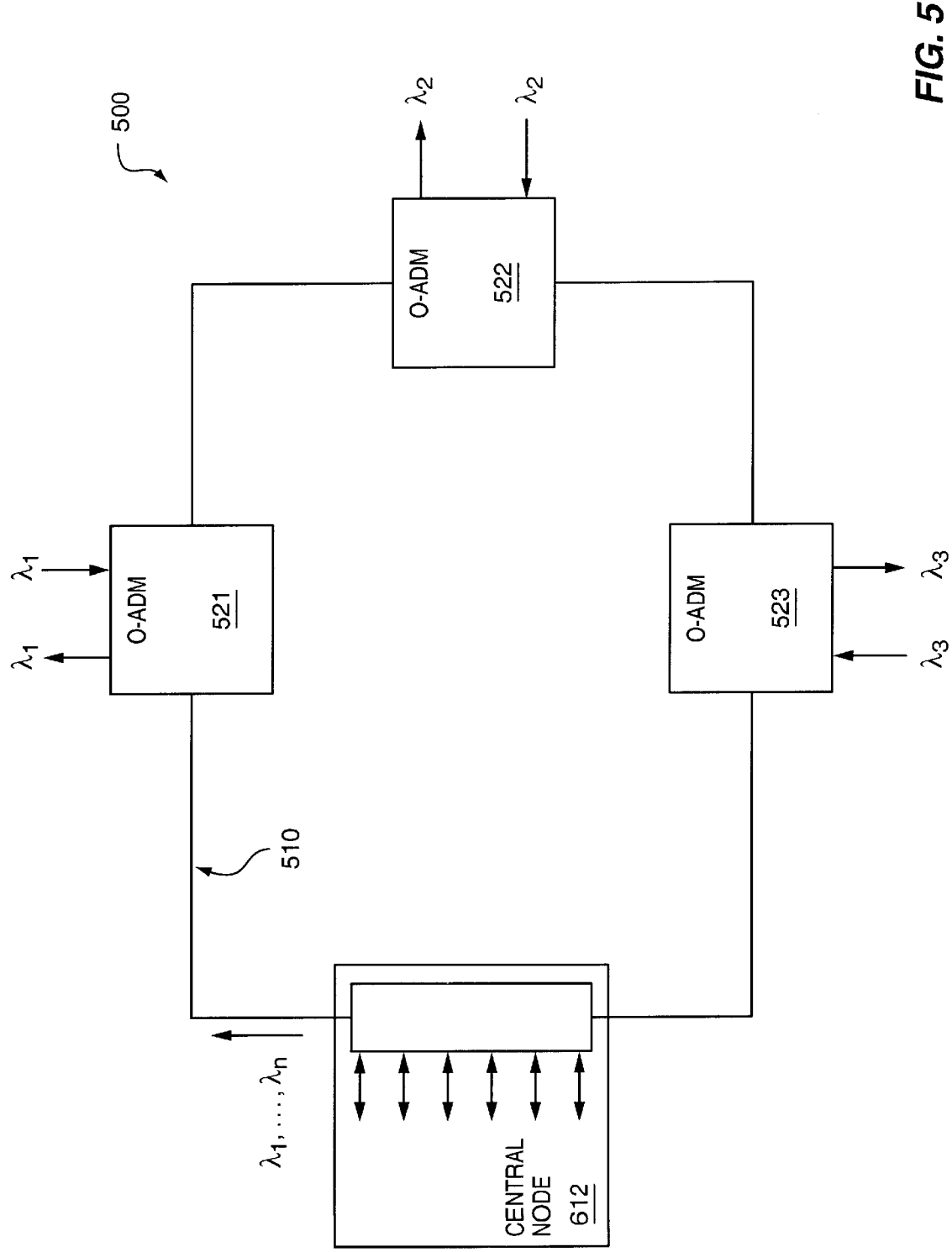
FIG. 5 is a block diagram depicting a Metropolitan Area Network using low insertion loss Optical Add-Drop Multiplexers in an example of the invention.

Metropolitan Area Network (MAN) Configuration and Operation—FIG. 5

FIG. 5 depicts an example of a Metropolitan Area Network (MAN) 500 in accord with the present invention. Those skilled in the art will appreciate numerous variations from this example that do not depart from the scope of the invention. Those skilled in the art will also appreciate that various features could be combined to form multiple variations of the invention.

MAN 500 is comprised of a fiber 510, a central node 512, and low insertion loss Optical Add-Drop Multiplexers (Q-ADMs) 521–523. Each end of fiber 510 is coupled to central node 512 to form a ring. O-ADMs 521–523 are coupled to fiber 510 in series. Central node 512 is any conventional node connected to a first system (not shown) and configured to transmit an optical signal comprised of wavelengths $\lambda_1$–$\lambda_n$ over fiber 510, transmit signals to the first system, and receive signals from the first system. O-ADM 521 is configured to receive the optical signal, drop a first wavelength from the optical signal, and transfer the optical signal. O-ADM 522 is configured to receive the optical signal, drop a second wavelength from the optical signal, and transfer the optical signal. O-ADM 523 is configured to receive the optical signal; drop a third wavelength from the optical signal, and transfer the optical signal. O-ADMs 521–523 are low insertion loss O-ADMs. Low insertion loss O-ADMs are O-ADMs with an insertion loss of less than approximately 1.00 dB. Approximately refers to insertion losses ranging from 0.95 dB to 1.05 dB.

In operation, central node 512 transmits an optical signal comprised of wavelengths $\lambda_1$–$\lambda_n$ over fiber 510. O-ADM 521 receives the optical signal from central node 512. O-ADM 521 drops a wavelength $\lambda_1$ from the optical signal and transfers $\lambda_1$ to a second system (not shown). O-ADM 521 transfers the optical signal comprised of wavelengths $\lambda_2$–$\lambda_n$ to O-ADM 522. O-ADM 522 drops a wavelength $\lambda_2$ from the optical signal and transfers $\lambda_2$ to a third system (not shown). O-ADM 522 transfers the optical signal comprised of wavelengths $\lambda_3$–$\lambda_n$ to O-ADM 523. O-ADM 523 drops a wavelength $\lambda_3$ from the optical signal and transfers $\lambda_3$ to a fourth system (not shown). O-ADM 523 transfers the optical signal comprised of wavelengths $\lambda_4$–$\lambda_n$ to central node 512.

In one embodiment, O-ADM 521 could also add wavelength $\lambda_1$ back to the optical signal by receiving wavelength $\lambda_1$ from the second system. O-ADM 522 could also add wavelength $\lambda_2$ back to the optical signal by receiving wavelength $\lambda_2$ from the third system. O-ADM 523 could also add wavelength $\lambda_3$ back to the optical signal by receiving wavelength $\lambda_3$ from the fourth system.

In another embodiment, MAN 500 could include a plurality of additional low insertion loss O-ADMs. The additional O-ADMs could drop additional wavelengths, such as $\lambda_4$–$\lambda_n$, from the optical signal. The additional O-ADMs could also add the additional wavelengths $\lambda_4$–$\lambda_n$ back to the optical signal.

MAN 500 is a significant advance in the art by utilizing O-ADMs 521–523 with insertion losses of less than approximately 1.00 dB. MANs in the prior art utilize O-ADMs with typical insertion losses of more than 1.6 dB. Therefore, MAN 500 is much more efficient, can grow much larger in size, and access many more o-ADM's than the MANs in the prior art. MAN 500 can grow 10 times larger than MANs in the prior art in some instances. Because optical fiber amplifiers are generally not used in conventional MANs, low insertion loss O-ADMs 521–523 are advantageous to drop and add wavelengths.

Figure 6:
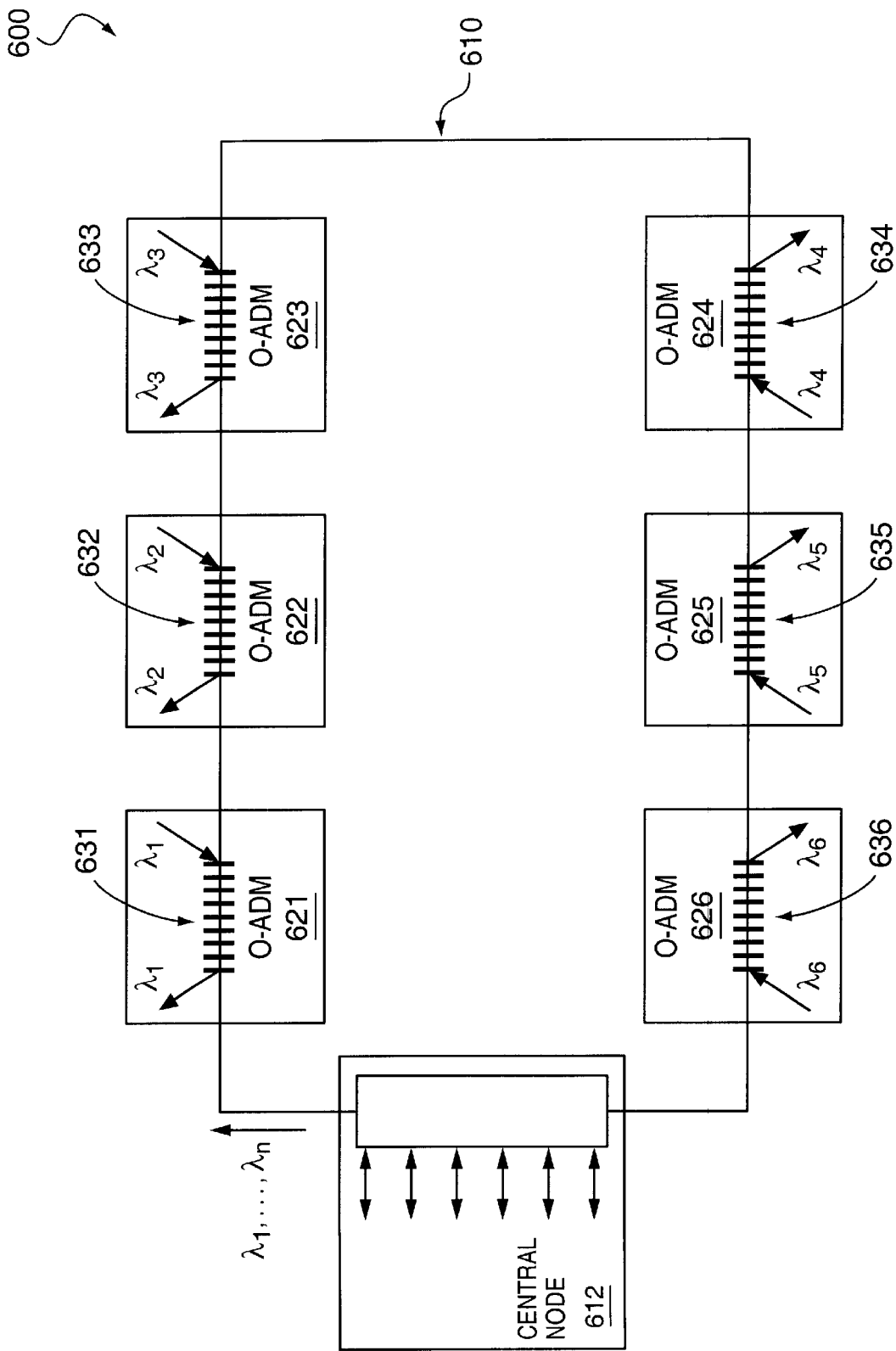
FIG. 6 is a block diagram depicting a Metropolitan Area Network using fused fiber Optical Add-Drop Multiplexers in an example of the invention.

Metropolitan Area Network (MAN) Configuration and Operation—FIG. 6

FIG. 6 depicts an example, of a Metropolitan Area Network (MAN) 600 in accord with the present invention. Those skilled in the art will appreciate numerous variations from this example that do not depart from the scope of the invention. Those skilled in the art will also appreciate that various features could be combined to form multiple variations of the invention.

Figure 1:
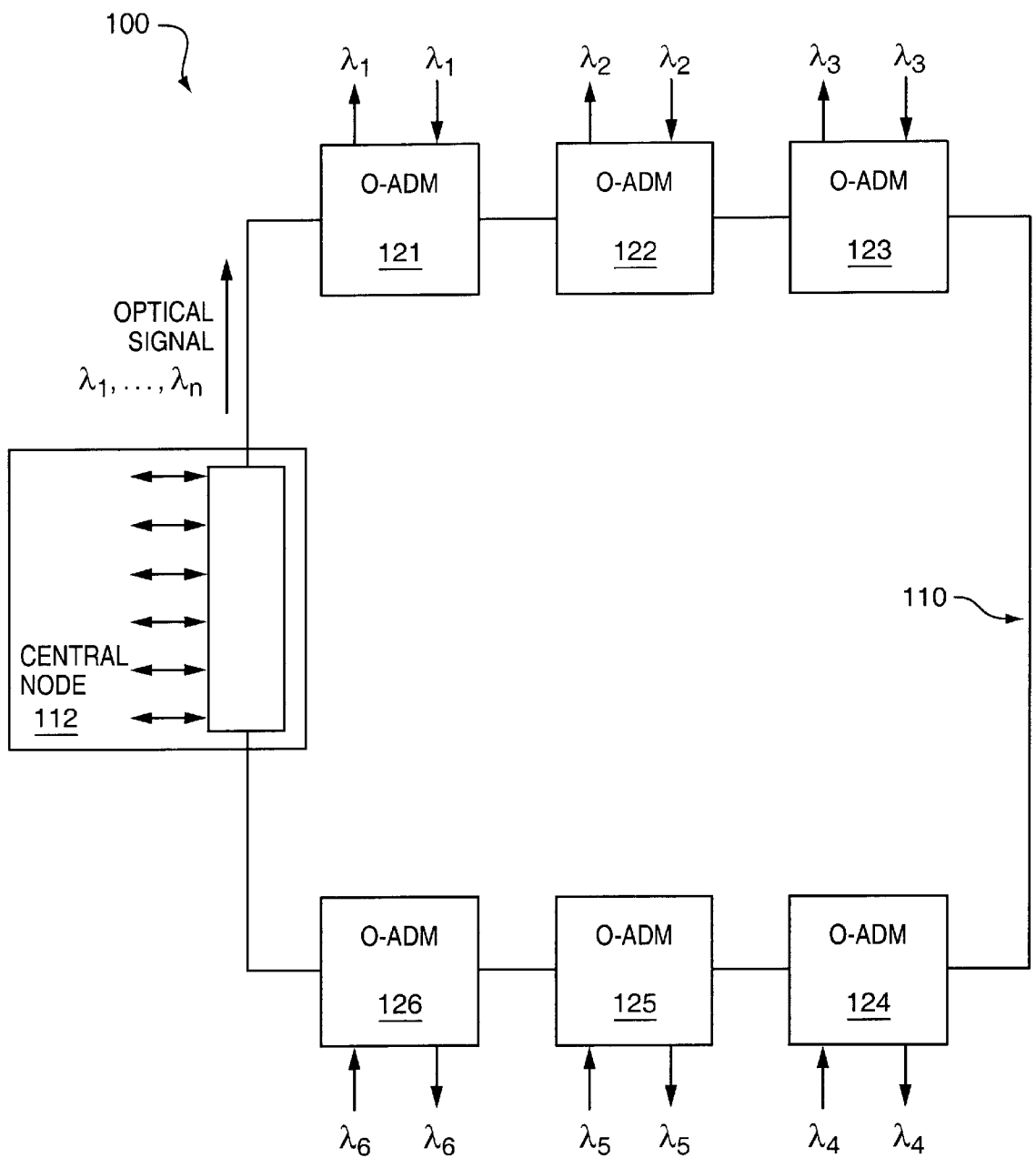
FIG. 1 is a block diagram depicting a Metropolitan Area Network (MAN) in the prior art.
Figure 2:
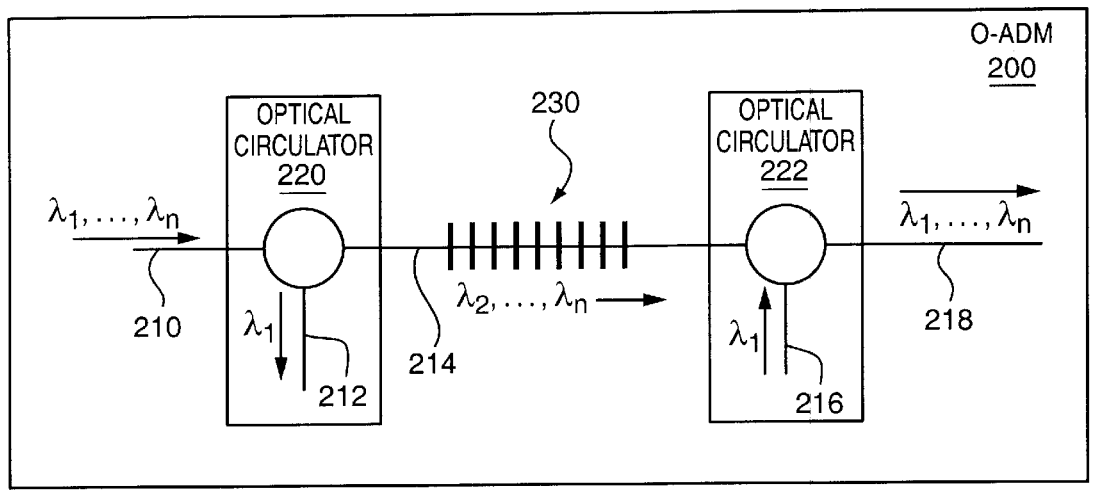
FIG. 2 is a block diagram depicting a fiber grating Optical Add-Drop Multiplexer in the prior art.
Figure 3:
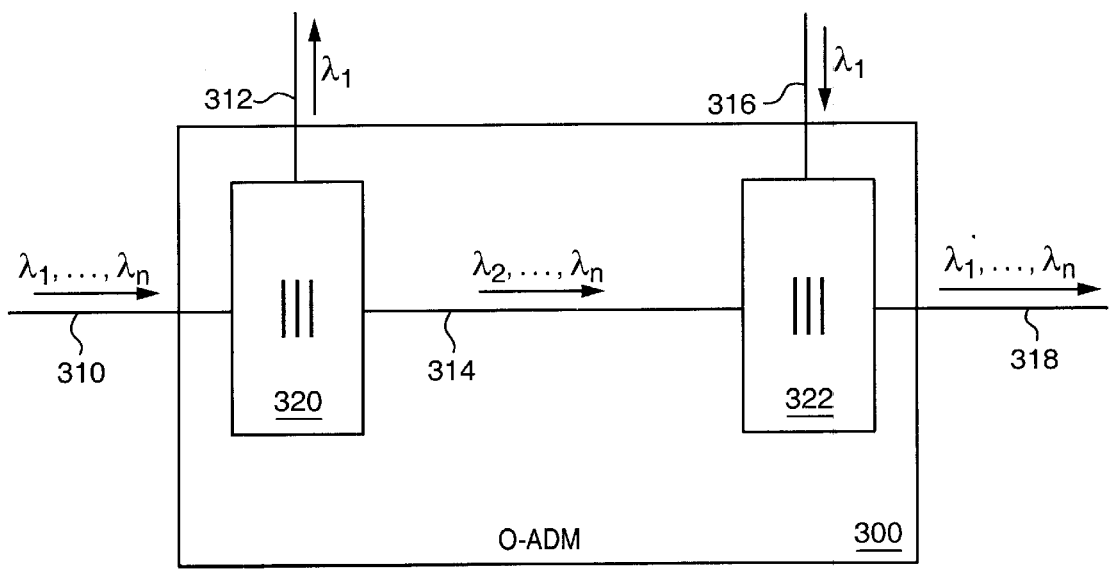
FIG. 3 is a block diagram depicting a dielectric film filter type Optical Add-Drop Multiplexer in the prior art.
Figure 4:
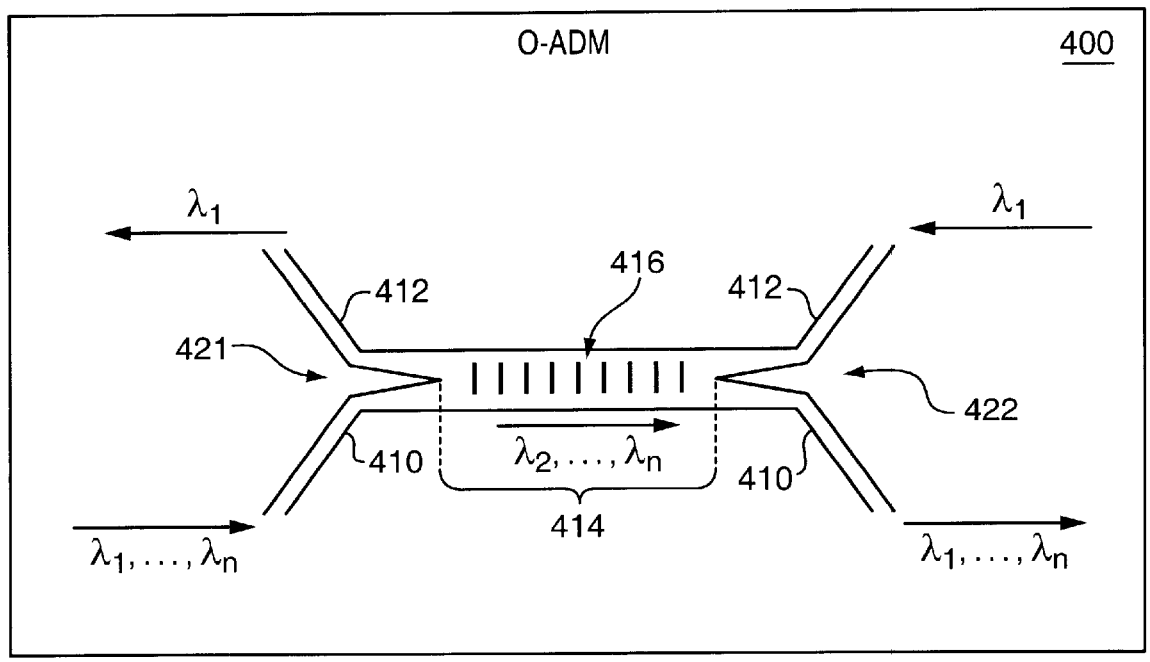
FIG. 4 is a block diagram depicting a fused fiber Optical Add-Drop Multiplexer in the prior art.

MAN 600 is comprised of a fiber 610, a central node 612, and fused fiber O-ADMs 621–626. Each end of fiber 610 is coupled to central node 612 to form a ring. O-ADMs 621–626 are coupled to fiber 610 in series. O-ADMs 621–626 include Bragg gratings 631–636, respectively. Central node 612 is any conventional node connected to a first system (not shown) and configured to transmit an optical signal comprised of wavelengths $\lambda_1$–$\lambda_n$ over fiber 610, transmit signals to the first system, and receive signals from the first system. O-ADMs 621–626 are fused fiber O-ADMs as shown in FIG. 4, which are low insertion loss O-ADMs. Low insertion loss O-ADMs are O-ADMs with an insertion loss of less than approximately 1.00 dB. Approximately refers to insertion losses ranging from 0.95 dB to 1.05 dB.

In operation, central node 612 transmits the optical signal comprised of wavelengths $\lambda_1$–$\lambda_n$ over fiber 610. O-ADM 621 receives the optical signal from central node 612. O-ADM 621 drops a wavelength $\lambda_1$ from the optical signal by reflecting $\lambda_1$ off of Bragg grating 631. O-ADM 621 transfers $\lambda_1$ to a second system (not shown). O-ADM 621 also adds $\lambda_1$ back to the optical signal by receiving $\lambda_1$ from the second system and reflecting $\lambda_1$ off of Bragg grating 631 into the optical signal. O-ADM 621 transfers the optical signal to O-ADM 622. O-ADM 622 drops a wavelength $\lambda_2$ from the optical signal by reflecting $\lambda_2$ off of Bragg grating 632. O-ADM 622 transfers $\lambda_2$ to a third system (not shown). O-ADM 622 also adds $\lambda_2$ back to the optical signal by receiving A2 from the third system and reflecting $\lambda_2$ off of Bragg grating 632 into the optical signal. O-ADM 622 transfers the optical signal to O-ADM 623. The same operation takes place over O-ADMs 623–626.

MAN 600 is a significant advance in the art by utilizing fused fiber O-ADMs 621–626 that each has an insertion loss of less than approximately 1.00 dB. MANs in the prior art utilize O-ADMs with a typical insertion loss of more than 1.6 dB. Therefore, MAN 600 is much more efficient, can grow much larger in size, and access many more O-ADM's than the MANs in the prior art. MAN 600 can grow 10 times larger than MANs in the prior art in some instances. Because optical fiber amplifiers are generally not used in conventional MANs, fused fiber O-ADMs 621–626 are advantageous to drop and add wavelengths.

Those skilled in the art will appreciate variations of the above-described embodiments that fall within the scope of the invention. As a result, the invention is not limited to the specific examples and illustrations discussed above, but only by the following claims and their equivalents.

We claim:

1. A Metropolitan Area Network (MAN), comprising:

an optical fiber;

a central node coupled to the optical fiber;

a first low insertion loss Optical Add-Drop Multiplexer (O-ADM) coupled to the optical fiber and configured to receive an optical signal from the central node, drop a first wavelength from the optical signal, and transfer the optical signal wherein the first low insertion loss O-ADM has an insertion loss of less than approximately 1.00 decibels (dB);

a second low insertion loss Optical Add-Drop Multiplexer (O-ADM) coupled to the optical fiber and configured to receive the optical signal from the first O-ADM, drop a second wavelength from the optical signal, and transfer the optical signal wherein the second low insertion loss O-ADM has an insertion loss of less, than approximately 1.00 dB; and a third low insertion loss Optical Add-Drop Multiplexer (O-ADM) coupled to the optical fiber and configured to receive the optical signal from the second O-ADM, drop a third wavelength from the optical signal, and transfer the optical signal wherein the third low insertion loss O-ADM has an insertion loss of less than approximately 1.00 dB.

2. The Metropolitan Area Network in claim 1 wherein the first O-ADM is further configured to add the first wavelength to the optical signal.

3. The Metropolitan Area Network in claim 1 wherein the second O-ADM is further configured to add the second wavelength to the optical signal.

4. The Metropolitan Area Network in claim 1 wherein the third O-ADM is further configured to add the third wavelength to the optical signal.

5. The Metropolitan Area Network in claim 1 further comprising a plurality of additional low insertion loss O-ADMs coupled to the optical fiber.

6. The Metropolitan Area Network in claim 1 where the optical signal comprises a Wavelength Division Multiplexed (WDM) optical signal.

7. The Metropolitan Area Network in claim 1 wherein the first O-ADM, the second O-ADM, and the third O-ADM are each comprised of:

a first fiber; and a second fiber coupled to the first fiber wherein a portion of the first fiber is fused to a portion of the second fiber to form a fused region wherein the fused region contains a fiber grating.

8. The Metropolitan Area Network in claim 7 wherein the fiber grating comprises a refractive index grating.

9. The Metropolitan Area Network in claim 7 wherein the fiber grating comprises a Bragg grating.

10. A method of operating a Metropolitan Area Network (MAN), comprising:

transmitting an optical signal from a central node to a first low insertion loss Optical Add-Drop Multiplexer (O-ADM);

dropping a first wavelength from the optical signal in the first O-ADM wherein dropping the first wavelength results in an insertion loss of less than approximately 1.00 decibels (dB);

transmitting the optical signal from the first O-ADM to a second low insertion loss Optical Add-Drop Multiplexer (O-ADM);

dropping a second wavelength from the optical signal in the second O-ADM wherein dropping the second wavelength results in an insertion loss of less than approximately 1.00 dB;

transmitting the optical signal from the second O-ADM to a third low insertion loss Optical Add-Drop Multiplexer (O-ADM); and dropping a third wavelength from the optical signal in the third O-ADM wherein dropping the third wavelength results in an insertion loss of less than approximately 1.00 dB.

11. The method in claim 10 further comprising adding the first wavelength to the optical signal in the first O-ADM.

12. The method in claim 10 further comprising adding the second wavelength to the optical signal in the second O-ADM.

13. The method in claim 10 further comprising adding the third wavelength to the optical signal in the third O-ADM.

14. The method in claim 10 further comprising dropping a plurality of additional wavelengths from the optical signal.

15. The method in claim 14 further comprising adding the plurality of additional wavelength to the optical signal.

* * * * *